US012179323B1

(12) United States Patent
Fleck

(10) Patent No.: US 12,179,323 B1
(45) Date of Patent: Dec. 31, 2024

(54) PUSH PIN INSTALLATION DEVICES AND METHODS OF INSTALLING PUSH PINS

(71) Applicant: Toyota Motor Engineering & Manufacturing North America, Inc., Plano, TX (US)

(72) Inventor: Brian A. Fleck, Versailles, KY (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 18/215,556

(22) Filed: Jun. 28, 2023

(51) Int. Cl.
*B25B 31/00* (2006.01)
*B25B 27/00* (2006.01)

(52) U.S. Cl.
CPC .......... *B25B 31/00* (2013.01); *B25B 27/0035* (2013.01)

(58) Field of Classification Search
CPC ..... B25B 27/00; B25B 27/0035; B25B 27/02; B25B 27/146; B25B 27/28; B25B 31/00; B25B 33/00; B25B 23/00–0042; B25C 1/02; B25C 3/006; Y10T 29/53943; Y10T 29/53952; Y10T 29/53987; Y10T 29/53996; Y10T 29/53909
See application file for complete search history.

(56) References Cited

U.S. PATENT DOCUMENTS 1,884,155 A * 10/1932 Oestnaes ............... B23P 11/005 29/441.1
2012/0096996 A1* 4/2012 Enos ..................... B25B 15/007 81/436

FOREIGN PATENT DOCUMENTS

| | | | | |
|---|---|---|---|---|
| CN | 203804925 U | | 9/2014 | |
| CN | 203804928 U | | 9/2014 | |
| CN | 204357879 U | | 5/2015 | |
| CN | 216913863 U | | 7/2022 | |
| GB | 2298608 A | * | 9/1996 | ............... B25C 1/02 |

* cited by examiner

*Primary Examiner* — Tyrone V Hall, Jr.
(74) *Attorney, Agent, or Firm* — Dinsmore & Shohl LLP

(57) ABSTRACT

A push pin installation device includes a handle, a shaft that extends outwardly from the handle and a sliding collar provided on the shaft that includes head with a bore that is sized to receive a push pin. The shaft and sliding collar are configured such that pushing on the handle moves the shaft through the bore farther into the sliding collar to apply a force against a push pin located in the bore.

11 Claims, 6 Drawing Sheets

PUSH PIN INSTALLATION DEVICES AND METHODS OF INSTALLING PUSH PINS

TECHNICAL FIELD

The present specification generally relates to the installation of push pins and, more specifically, to push pin installation devices and methods of installing push pins.

BACKGROUND

Automotive trim and panel clips are fasteners that are commonly used to hold trim and panels together or to other automotive body structures. There are various types of clips, such as one-piece push pins and two-piece push pins. Single-piece push pins may be simpler to manufacture and less expensive, but may provide more limited clipping strength compared to two-piece push pins that expand in the widthwise direction as they are installed due to their two-piece structure. Typically, the push pins, whether one-piece or two-piece, are installed manually by pushing the push pins into designated openings using one's hand.

What is needed are push pin installation devices and methods of installing push pins.

SUMMARY

In accordance with one embodiment, a push pin installation device includes a handle, a shaft that extends outwardly from the handle and a sliding collar provided on the shaft that includes head with a bore that is sized to receive a push pin. The shaft and sliding collar are configured such that pushing on the handle moves the shaft through the bore farther into the sliding collar to apply a force against a push pin located in the bore.

In accordance with another embodiment, a method of installing a push pin in a pin-receiving bore using a push pin installation tool is provided. The method includes placing a push pin within a pin-receiving bore of the pin installation tool. The pin installation tool includes a handle, a shaft that extends outwardly from the handle and a sliding collar provided on the shaft that includes head with a bore that is sized to receive a push pin. The handle is pushed on thereby moving the shaft through the bore farther into the sliding collar applying a force against a push pin located in the bore.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following description of the illustrative embodiments can be understood when read in conjunction with the following drawings, where like structure is indicated with like reference numerals and in which:

DETAILED DESCRIPTION

Figure 1A:
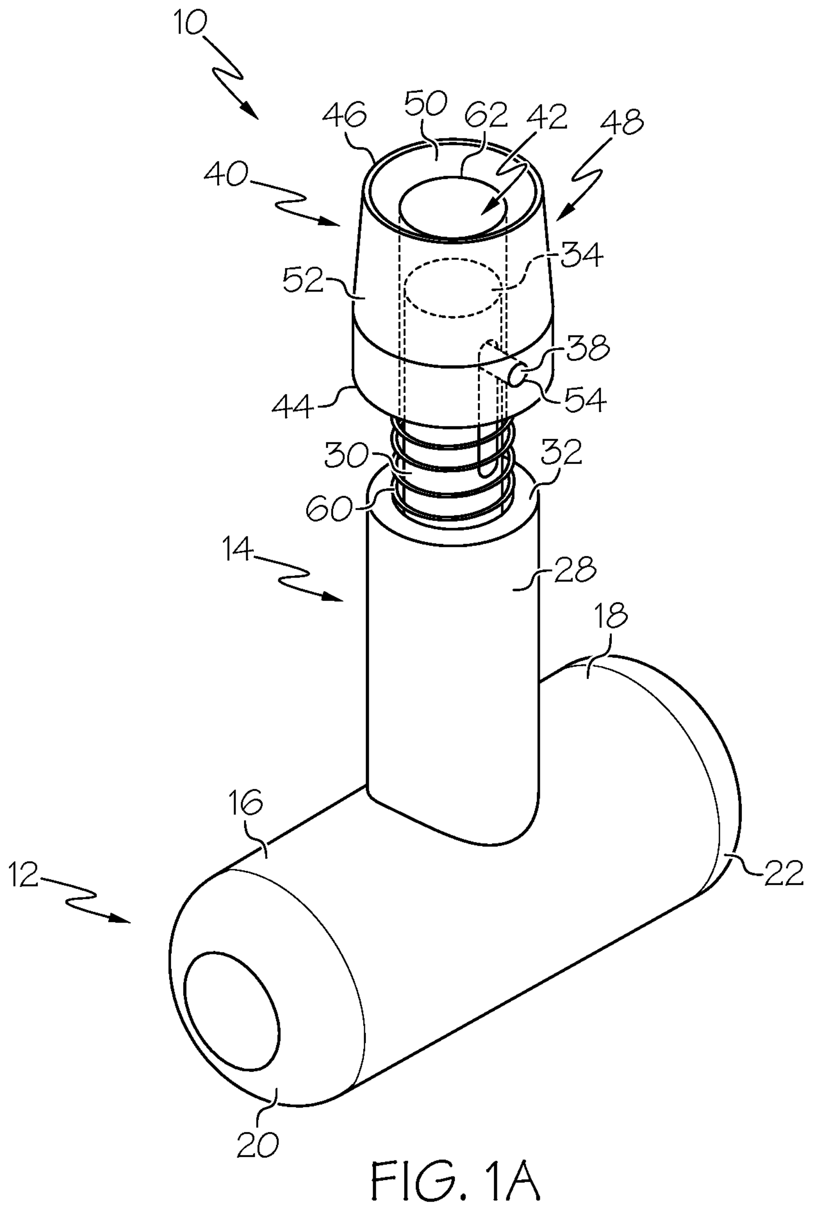
FIG. 1A depicts a perspective view of a push pin installation device with a sliding collar in an extended position, according to one or more embodiments shown and described herein.

Embodiments described herein are directed to push pin installation devices that can be used to push pins into pin-receiving openings for installation. The push pin installation devices include a handle and a shaft that extends outwardly from the handle. A sliding collar is provided on the shaft that includes head with a bore that is sized to receive a push pin. Pushing on the handle moves the shaft into the sliding collar to apply a force against the push pin located in the bore. The sliding collar may be biased toward an extended position, for example, by a spring that is located around the shaft and between the sliding collar and a stop surface that may be provided by an enlarged portion of the shaft. The shaft may extend outward from a center of the handle forming a T-shaped push pin installation device.

Referring to FIG. 1, a push pin installation device 10 includes a handle 12 and a shaft 14 that extends outward from the handle 12. In some embodiments, the handle 12 may be round in cross-section, such as circular, defining a cylindrical shape; however, any suitable cross-sectional shape may be used such as polygonal. Opposite sides 16 and 18 of the handle 12 may include tapered portions 20 and 22 that are spherical segments in shape and extend outward from the sides 16 and 18 to planar ends 24 and 26.

In some embodiments, the shaft 14 extends outward from a center of the handle 12 forming a T-shape. In other embodiments, the shaft 14 may extend outward from the handle 12 closer to one side 16, 18 than the opposite side 16, 18, forming more of an L-shape. The shaft 14 includes an enlarged portion 28 that intersects the handle 12 and a narrow portion 30 that extends outward from an end 32 of the enlarged portion 28 forming a stop surface, also represented by element 32. In the illustrated example, the shaft 14 is illustrated as being round in cross-section, such as circular; however any suitable shape may be used such as polygonal. Further, the narrow portion 30 and the enlarged portion 28 may be the same or different cross-sectional shapes.

Figure 1B:
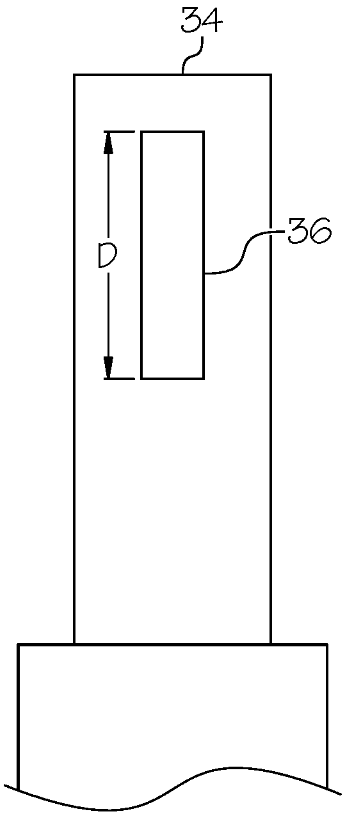
FIG. 1B depicts a side view of a shaft of the push pin installation device of FIG. 1A, according to one or more embodiments shown and described herein.

Referring also to FIG. 1B, the narrow portion 30 extends outward from the end 32 of the enlarged portion 28 to a terminal end 34. A pin-receiving slot 36 extends lengthwise along the narrow portion 30 and is sized to slidingly receive a guide pin 38 of a sliding collar 40. The pin-receiving slot 36 defines a maximum distance D that the sliding collar 40 can slide along the length of the narrow portion 30 between extended and retracted positions.

Figure 1C:
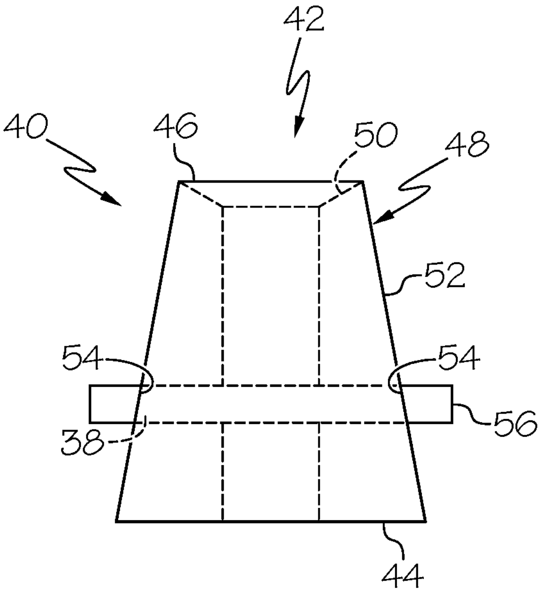
FIG. 1C depicts a side view of the sliding collar of FIG. 1A, according to one or more embodiments shown and described herein.

Referring now to FIGS. 1A and 1C, the sliding collar 40 is slidably connected to the shaft 14 about the narrow portion 30. The sliding collar 40 has a bore 42 extending therethrough that is sized to slidably receive the narrow portion 30. The sliding collar 40 includes a handle-facing end 44 and an opposite, part-facing end 46. A head 48 of the collar includes the part-facing end 46 and may include a tapered end surface 50 that tapers inward to the bore 42 that can be used to guide a push pin into the bore 42. The sliding collar 40 further includes the guide pin 38. In some embodiments, the guide pin 38 extends between opposite sides of a sidewall 52 of the sliding collar 40. For example, the sidewall 52 may include opposite openings 54 that are sized to sliding receive the guide pin 38 therethrough. In some embodiments, a band 56, such as a grommet, may be placed around the openings 54 to hold the guide pin 38 in place once inserted into the openings 54.

Figure 2:
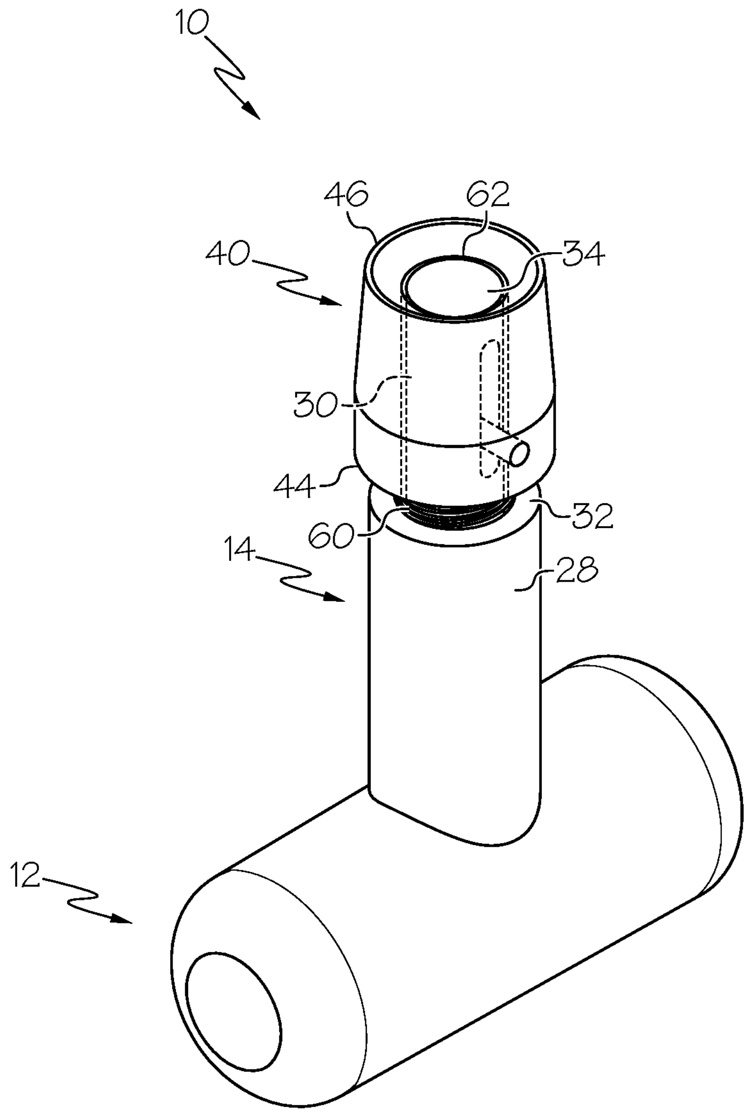
FIG. 2 depicts a perspective view of the push pin installation device of FIG. 1A with the sliding collar in a retracted position, according to one or more embodiments shown and described herein.

Referring again to FIG. 1A and also to FIG. 2, the sliding collar 40 is configured to slide along the length of the narrow portion 30 of the shaft 14. A biasing member, such as spring 60 may be provided around the narrow portion 30 and between the handle-facing end 44 and the stop surface 32 of the enlarged portion 28. The spring 60 provides a biasing force against the handle-facing end 44 to bias the sliding collar 40 from the retracted position (FIG. 2) toward the extended position (FIG. 1A). In the extended position shown by FIG. 1A, the terminal end 34 of the narrow portion 30 is farther recessed from a bore end 62 and the part-facing end 46. In the retracted position shown by FIG. 2, the terminal end 34 of the narrow portion 30 is less recessed from the bore end 62 and the part-facing end 46 compared to the extended position. This decrease in distance D allows the terminal end 34 to press against an end of a push pin that is located in the bore 42 at the part-facing end 46 once the sliding collar 40 is retracted a certain amount. In this regard, the spring 60 may be selected to have a spring constant k to provide an initial amount of push force against the push pin using the sliding collar 40 and the shaft 14 may then apply a second, additional amount of push force depending on the mount of manual force applied to the handle 12.

Figure 3:
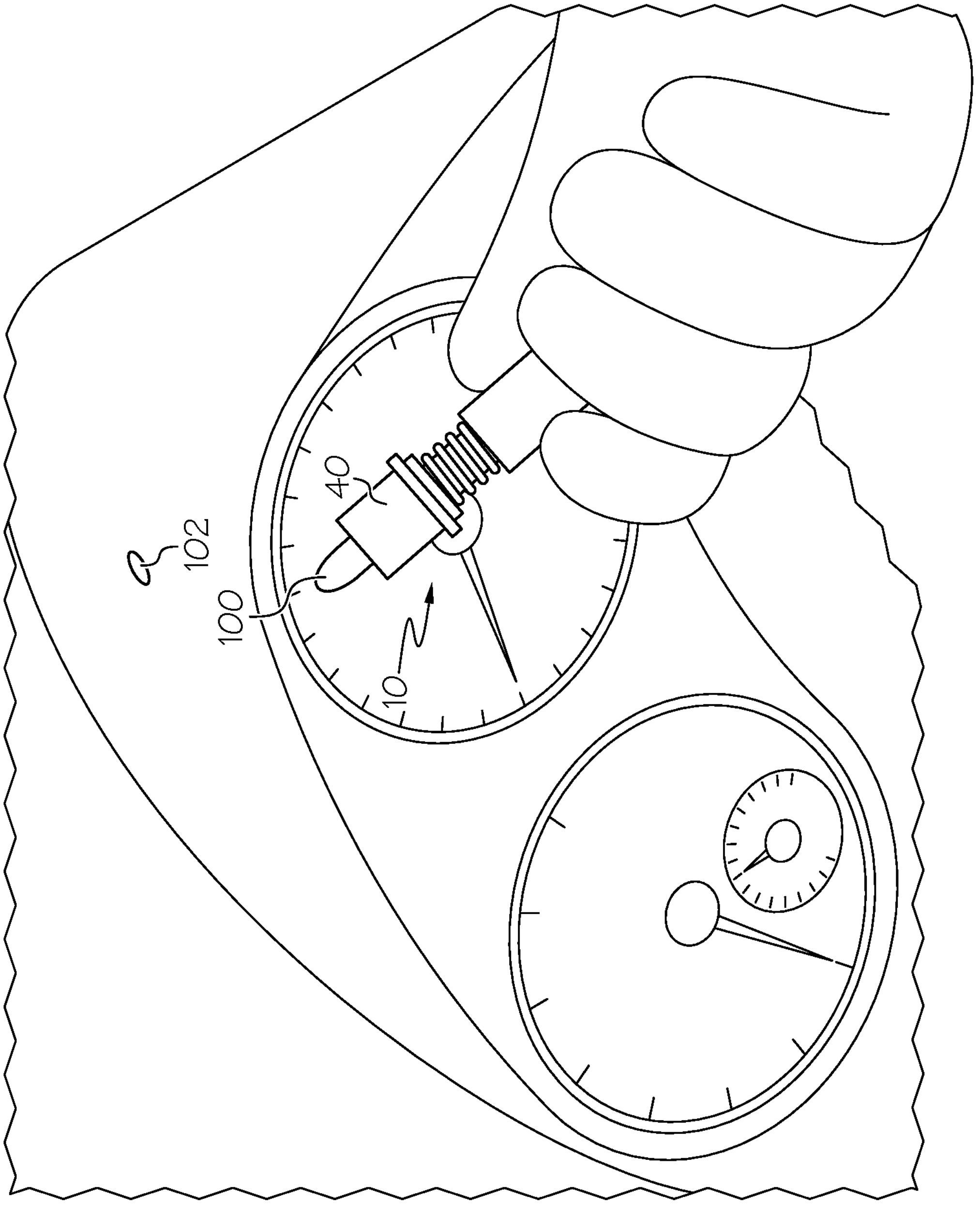
FIG. 3 depicts the push pin installation device of FIG. 1 in use, according to one or more embodiments shown and described herein.
Figure 4:
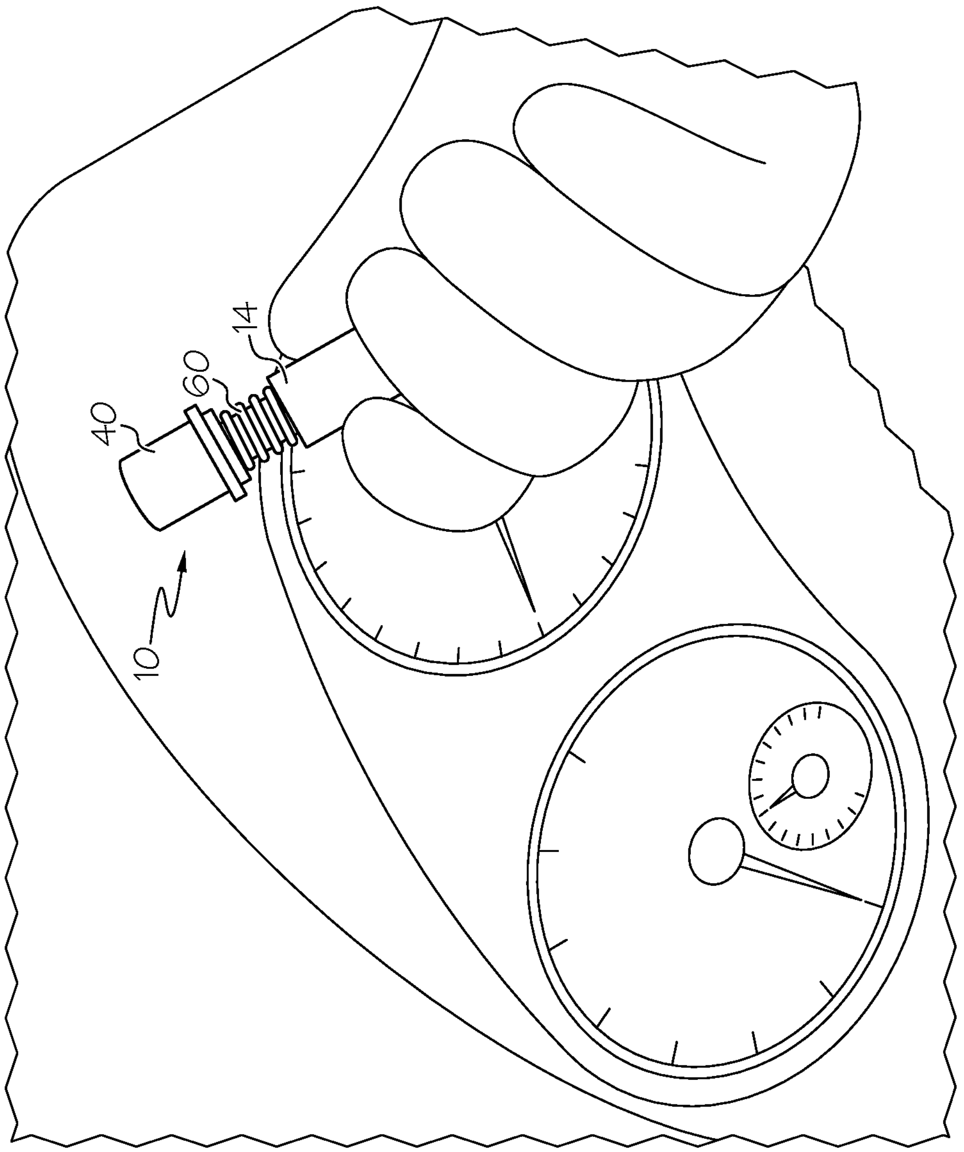
FIG. 4 depicts the push pin installation device of FIG. 1 in use, according to one or more embodiments shown and described herein.
Figure 5:
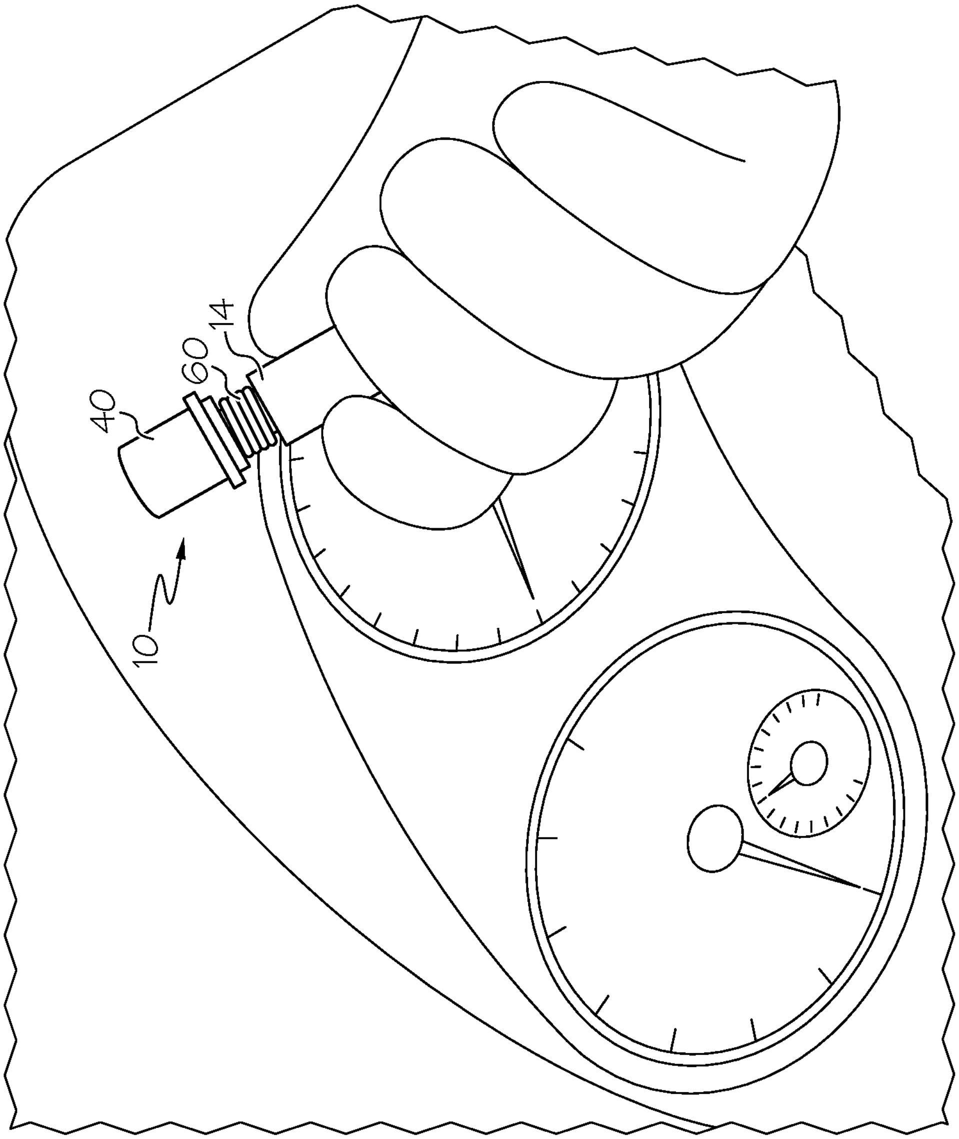
FIG. 5 depicts the push pin installation device of FIG. 1 in use, according to one or more embodiments shown and described herein.

FIGS. 3-5 illustrate a method of installing a push pin 100 into a pin-receiving opening 102 (FIG. 3) using the push pin installation device 10. Referring first to FIG. 3, the handle 12 (FIG. 1A) of the push pin installation device 10 is grasped manually and the push pin 100 is inserted into the bore 42 of the sliding collar 40 with the sliding collar 40 in the extended position (FIG. 1A). The tapered end surface 50 of the sliding collar 40 can help guide the push pin 100 into the bore 42 and also stabilize and support the push pin 100 once the push pin 100 is located in the bore 42 in a proper orientation.

Referring next to FIG. 4, once the push pin 100 is placed in the pin-receiving opening 102 with the sliding collar 40 in the extended position, the handle 12 is pressed manually and an initial amount of force is applied to the push pin 100 using only the spring force of the spring 60. Referring to FIG. 5, when the sliding collar 40 is retracted, the terminal end 34 of the shaft 14 contacts and pushes against the push pin 100 thereby applying a second, additional amount of push force against the push pin 100. In some embodiments where the push pin is a two-stage locking clip, the shaft 14 can be used to apply the additional force to expand locking fingers of the push pin 100 and expand a width of the push pin 100 so that it locks into place.

The above-described push pin installation devices allow for placement and setting of push pins within pin-receiving openings using a tool rather than using ones thumbs, which can provide added efficiency and ergonomic comfort. One simple motion can be used to provide different levels of push force in order to place and set the push pins using the pin installation devices.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A push pin installation device comprising:

a handle;

a shaft that extends outwardly from the handle, the shaft comprising an enlarged portion connected to the handle and a narrow portion that extends outward from a stop surface at an end of the enlarged portion to a terminal end;

a sliding collar provided on the shaft that includes head with a bore that is sized to receive a push pin; and a spring configured to bias the sliding collar toward an extended position, the spring located around the narrow portion and entirely between a handle-facing end of the sliding collar and the stop surface and spaced from the handle;

wherein the shaft and sliding collar configured such that pushing on the handle moves the shaft through the bore farther into the sliding collar to apply a force against a push pin located in the bore.

2. The push pin installation device of claim 1, wherein the shaft extends outward from a center of the handle.

3. The push pin installation device of claim 1, wherein the narrow portion having a pin-receiving slot that extends lengthwise along the narrow portion.

4. The push pin installation device of claim 3, wherein the sliding collar comprises a guide pin that extends across the bore, the guide pin received by the pin-receiving slot.

5. The push pin installation device of claim 1, wherein the sliding collar having the handle-facing end and an opposite part-facing end, the part facing end including a tapered surface that tapers inwardly toward an opening to the bore.

6. A method of installing a push pin in a pin-receiving bore using a push pin installation tool, the method comprising:

placing a push pin within a pin-receiving bore of the pin installation tool, the pin installation tool comprising:

a handle;

a shaft that extends outwardly from the handle, the shaft comprising an enlarged portion connected to the handle and a narrow portion that extends outward from a stop surface at an end of the enlarged portion to a terminal end;

a sliding collar provided on the shaft that includes head with a bore that is sized to receive a push pin; and a spring configured to bias the sliding collar toward an extended position, the spring located around the narrow portion and entirely between a handle-facing end of the sliding collar and the stop surface and spaced from the handle; and pushing on the handle thereby moving the shaft through the bore farther into the sliding collar applying a force against a push pin located in the bore.

7. The method of claim 6 further comprising biasing the sliding collar toward the extended position by the spring.

8. The method of claim 7, wherein the step of applying a force comprises applying a first force using the spring and applying a second force using the shaft.

9. The method of claim 6, wherein the narrow portion having a pin-receiving slot that extends lengthwise along the narrow portion.

10. The method of claim 9, wherein the sliding collar comprises a guide pin that extends across the bore, the guide pin sliding within the pin-receiving slot while moving the shaft through the bore.

11. The method of claim 6, wherein the sliding collar having a handle-facing end and an opposite part-facing end, the part facing end including a tapered surface that tapers inwardly toward an opening to the bore.

* * * * *